United States Patent
Rivin

Patent Number: 5,891,278
Date of Patent: Apr. 6, 1999

[54] PNEUMATIC WHEELS

[76] Inventor: Evgeny I. Rivin, 30236 Southfield Rd., #249, Southfield, Mich. 48076

[21] Appl. No.: 778,831

[22] Filed: Jan. 7, 1997

[51] Int. Cl.⁶ .................................................. B60C 23/18
[52] U.S. Cl. ........................................... 152/418; 152/400
[58] Field of Search ....................... 301/5.1, 95; 152/153, 152/158, 379.3, 379.4, 379.5, 381.3, 381.4, 381.5, 381.6, 382, 384, 339.1, 340.1, 399, 400, 401, 418

[56] References Cited

U.S. PATENT DOCUMENTS

| | | | |
|---|---|---|---|
| 2,399,572 | 4/1946 | Powell et al. | 152/400 |
| 4,143,697 | 3/1979 | Igea et al. | 152/400 X |
| 4,418,734 | 12/1983 | Dobson | 152/401 X |
| 4,896,921 | 1/1990 | Sato et al. | 152/381.5 X |

FOREIGN PATENT DOCUMENTS 4317268  12/1994  Germany ............................ 152/381.5

Primary Examiner—Russell D. Stormer

[57] ABSTRACT

A wheel with a pneumatic tire, with the tire cavity divided into two fluid-filled reservoirs connected with a passageway (orifice, capillary, or porous material) having a required degree of flow restriction in order to generate a desired damping action when the tire is subjected to a vibratory exertion. The flow in the passageway is maintained at a laminar regime.

13 Claims, 3 Drawing Sheets

PNEUMATIC WHEELS

FIELD OF THE INVENTION

The present invention relates to wheels with pneumatic or other fluid-filled tires for surface on-road and off-road vehicles.

BACKGROUND OF THE INVENTION

Most modern transportation vehicles, agricultural tractors and implements, aircraft while performing surface conveyance (takeoff and landing), etc., are equipped with wheels having pneumatic tires inflated by a compressed fluid. Most frequently, the tires are inflated by compressed air, although some other media are used, such as water, in some agricultural applications.

Besides the main task - to insure reliable grip with the road surface - pneumatic tires also create a resilient connection between the vehicle and the road surface in which the resilience depends mainly on the pressure of air in the tire. The damping effect of this resilient connection is usually very small and is determined mainly by the damping characteristics of the tire material. As a result, when disturbances from the road have frequencies sufficiently higher than the natural frequency of the vehicle/tire system ("hop frequency"), the tires behave as vibration isolators, but for vibration frequencies close to the hop frequency, tires tend to worsen the vibration effect on the vehicle. If the vehicle has a suspension system, the harmful increases of the vibration effects on the vehicle when the frequency is near the hop frequency are alleviated, because the natural frequency of the suspension system is usually much lower than the hop frequency. However, even a limited increase of the vibration level at the tire's natural frequency is very unpleasant and in many cases can force the designer to lower the natural frequency of the suspension system. Especially bad consequences for the strength of the vehicle and its component units, passenger comfort, cargo conditions, etc., are encountered in cases when the tires are the sole resilient element, such as in wheeled tractors or bicycles. In such cases, the maximum speed of the vehicle while on a given road surface may be limited by the resonant amplitudes of vibration of the vehicle on tires. Increasing damping of the tires would reduce these resonant amplitudes and thus would alleviate the negative effects listed above as well as allow higher effective maximum speed.

This can be accomplished by providing a means by which a part of vibrational energy is dissipated (transformed to heat), thereby damping road-induced shocks and vibrations but which does not cause energy losses resulting from the rolling motion of the tire. Such means, proposed in U.S. Pat. No. 4,289,187 to E. Rivin (author of this invention), comprises a damping fluid chamber supported on the wheel and connected with the tire cavity by an energy-dissipating passage having a specified flow resistance. The system described in U.S. Pat. No. 4,289,187 was successfully tested as described in: B. Bachrach, E. Rivin, "Pneumatic Damping of Vehicle Tires to Improve Ride Quality", Proceedings of the Fifth International Conference on Vehicular Structural Mechanics, vol. P-144, SAE, 1984. While the positive effect of the system was demonstrated, its limitation was found to be a very small change of volume (and pressure) in the tire cavity when the wheel is subjected to vibratory loads. Only a 3% fraction of the tire reaction to its vibratory displacement caused by the road unevenness was found to be accommodated by the pressure change in the tire cavity. The bulk of the reaction is due to structural stiffness of the inflated tire and due to changes in the tire footprint area. Thus, while the system per U.S. Pat. No. 4,289,187 was proven to be useful, its performance capacity is rather limited. The performance capacity is also a function of volume ratio between the damping chamber and the tire cavity, thus the chamber has to be large to enhance the performance characteristics. Attachment of a large chamber to the wheel structure would require its expensive changes and is undesirable because of weight and packaging constraints.

While the role of vehicle tires in providing protection for passengers and cargo from the road-induced excitations is important, tires themselves may become sources of vibrations due to high-frequency acoustic resonance of their internal cavities. These resonant vibrations can be responsible for annoying components of noise in the vehicle passenger compartment. The frequency range of these annoying sound components is about 100–200 Hz, which is difficult to adequately isolate. An example of special means to reduce this noise is represented by U. S. Pat. No. 4,896,921 granted to C. Sato, et al. This patent teaches several chambers ("resonators") attached to the wheel and connected to the tire cavity though calibrated passages (similar to design of U.S. Pat. No. 4,289,187). Such design requires special and expensive wheel modifications. Other known designs, such as U.S. Pat. No. 4,909,295 granted to T. Nirei, et al, involve modifications to the tire structures, also rather expensive.

SUMMARY OF THE INVENTION

The present invention addresses the inadequacies of the prior art by using a partition or hollow insert(s) inside the tire cavity, with the internal (damping) chamber generated by the partition or within the insert(s) connected with the tire cavity via calibrated passage(s), preferably providing a laminary flow of air or another medium filing the tire. Such a design increases an effective relative change of volume of the tire since the absolute change of volume does not change but the volume accommodating this change is reduced due to presence of the partition or insert(s); increases the ratio of volume of the internal (damping) chamber(s) to the effective volume of the tire cavity; divides the volume of the tire cavity into smaller volumes thus increasing the resonance frequency of the fluid medium (air) inside the tire and reducing the annoying noise. All these effects can be achieved even if standard wheels and tires are used.

These and other advantages of the present invention will be readily apparent from the drawings, discussion, and claims which follow.

BRIEF DESCRIPTION OF THE DRAWINGS

The present invention can best be understood with reference to the following detailed description and drawings in which.

DETAILED DESCRIPTION OF THE PREFERRED EMBODIMENTS

Figure 1:
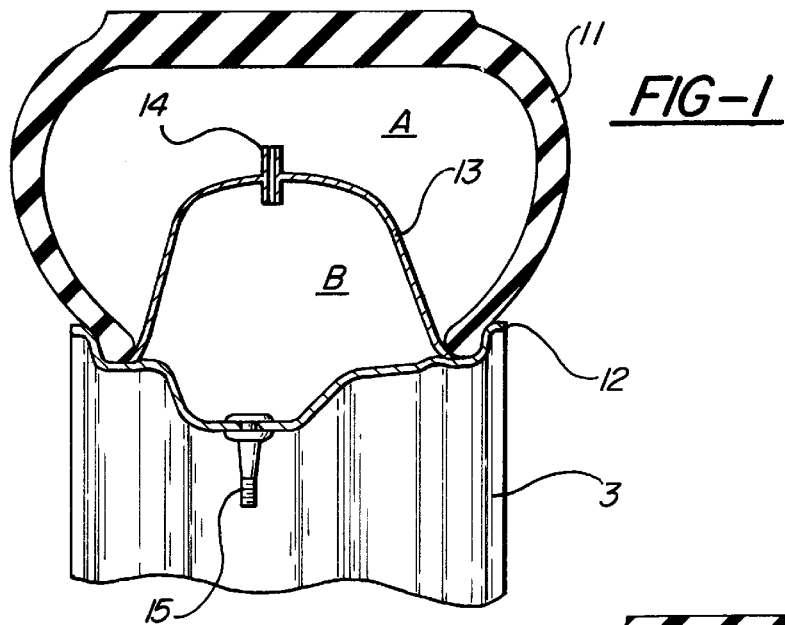
FIG. 1 shows schematic of one embodiment of the proposed wheel with the partitioned tire cavity as seen in a radial cross section.

FIG. 1 illustrates one embodiment of the proposed design of the pneumatic wheel. Pneumatic tire 11 is mounted on rim 12 of the wheel. Inner cavity of tire 11 is divided into two parts A and B by partition 13 made of metal or plastic/ elastomer. The tire cavity A is connected with the damping chamber B generated by partition 13 via opening (passageway), preferably orifice or capillary, 14 made in or attached to partition 13, respectively. Specifically, a capillary 14 is shown in FIG. 1. The tire is inflated via nipple 15.

Partition 13 in FIG. 1 is neither a part of tire 11 nor a part of wheel rim 12. It can be snapped in place or attached by commonly known means such as glue, welding, etc. to fire 11 or to wheel rim 12. It is preferable that there is a tight (without leakage) contact between partition 13 and tire 11 or wheel rim 12 so that the only flow path between volumes A (tire cavity) and B (chamber) is through elongated capillary/ orifice 14. If partition 13 is made of metal and attached to wheel rim 12, its shape and size should be designed in such a way that it does not prevent fitting of tire 11 on wheel rim 12. If partition 13 is made of plastic or elastomer and attached to rim 12, its shape and size should be designed in such a way that it does not prevent fitting of tire 11 on wheel rim 12 or it should be made collapsible so that partition 13 collapses when tire 11 is put on or removed from wheel rim 12 and then springs back. If partition 13 is attached to tire 11, it has to possess a springing action in the axial direction in order to facilitate fitting and removing of tire 11 to/from wheel rim 12.

Figure 2:
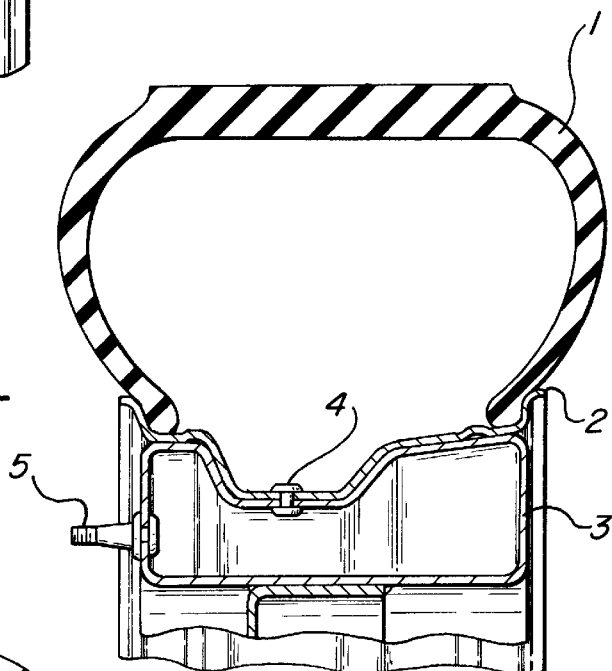
FIG. 2 shows the prior art to the present invention as depicted in FIG. 1 of U.S. Pat. No. 4,289,187.

Since the volume change (and associated pressure change) in tire under vibratory loading is small, as it was presented above, these small pressure changes wouldn't create a significant air flow in the passage 4 between the cavity of tire 1 and the damping chamber 3 in FIG. 2 which is taken from U.S. Pat. No. 4,289,187 (the prior art). The embodiment presented in FIG. 1 allows to achieve two desired effects necessary for enhancing damping of the tire: increasing pressure change in the tire cavity for a given change in radial loading of the tire, and increasing ratio between volumes of the damping chamber and of the tire cavity without a need to physically increase the size of the damping chamber (which is usually undesirable).

It is obvious from FIG. 1 that any change of volume inside tire 11 is confined to the volume A between the shell of tire 11 and partition 13 ("effective tire cavity"). Since the volume A is smaller than the total volume A+B inside the tire, the change of pressure in the volume A is more than it would be if partition 13 were not present. The larger pressure differential between the effective tire cavity A and the damping chamber B would result in a more intense flow through passage 14 and thus, in more energy dissipation and in higher damping. Since the effective tire cavity volume A can be made significantly smaller than the total volume A+B inside the tire, the important volume ratio B/A can be increased even without adding additional chambers to the wheel. Since both factors influencing pneumatic damping of the tire are enhanced in design in FIG. 1 relative to design in FIG. 2 (the pressure changes are intensified and the volume ratio is enhanced), damping of the pneumatic wheel in FIG. 1 will be higher than that of the prior art wheel in FIG. 2.

Breaking the volume of the internal cavity of the tire into two separate volumes A and B in FIG. 1 would also change acoustic characteristics of the tire. Firstly, the lowest natural frequency of the tire cavity would increase, thus reducing transmission of the resonant vibrations into the vehicle interior. This effect is due to a better filtering of higher frequency vibrations by the suspension and by structural components of the vehicle. Also, the presence of the energy-dissipating passageway 14 between volumes A and B would reduce intensity of the acoustic resonance.

Figure 3:
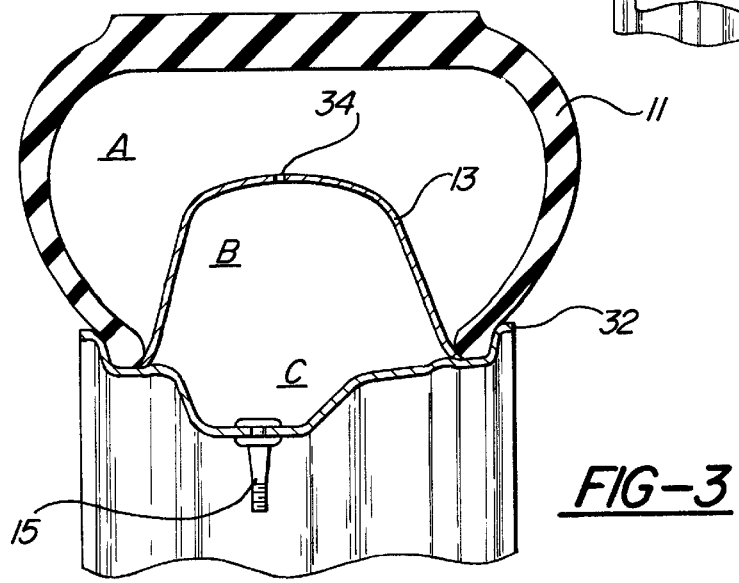
FIG. 3 shows a radial cross section of another embodiment of the proposed wheel in which the wheel rim is intentionally modified.

While the embodiment in FIG. 1 provides a significant improvement relative to the prior art design in FIG. 2, its performance would be even further improved if the volume of the damping chamber B were increased. It is accomplished in the embodiment depicted in FIG. 3 wherein wheel rim 32 is shaped as shown in the tire fitting area C in order to provide additional volume for the tire cavity. Orifice 34 is used as a passageway between the effective tire cavity A and the damping chamber B.

Figure 4:
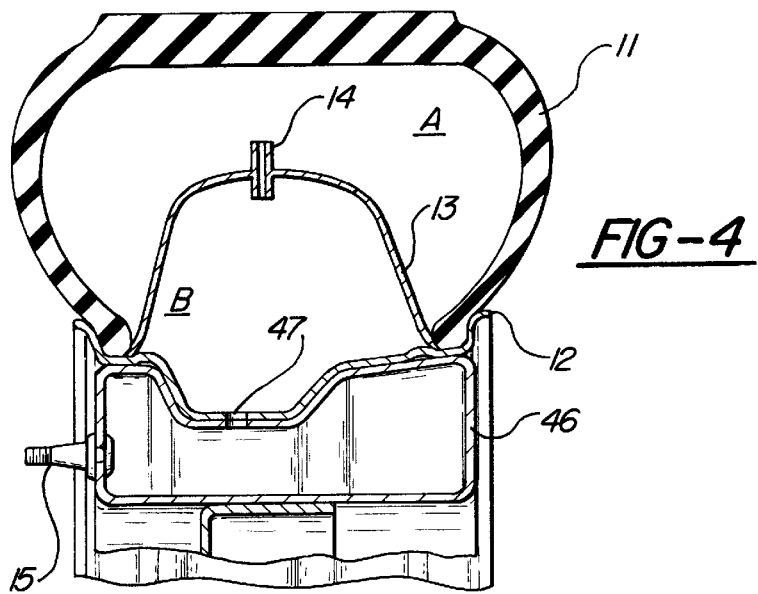
FIG. 4 shows a radial cross section of yet another embodiment of the proposed wheel in which an external vessel is added to the damping chamber volume.

The same goal of enlarging the effective volume of the damping chamber can be achieved by adding external vessel (s) as shown in FIG. 4, wherein the external vessel 46 is connected with the damping chamber B by passage 47, preferably having a low flow resistance. While only one vessel is shown in FIG. 4, there can be more than one vessel supported on the wheel.

Figure 5:
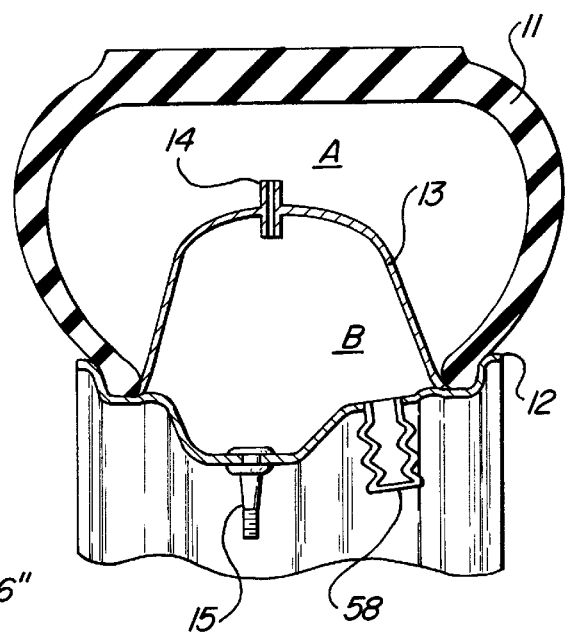
FIG. 5 shows a radial cross section of an embodiment of the proposed wheel wherein the external vessel has an expandable volume.

The effective volume of the damping chamber can be further enhanced by making the external vessel expandable under increasing pressure of the medium inside. It can be achieved by using an elastic material for at least part of the vessel construction, or by using a bellows-like structures 58 as shown in FIG. 5.

Figure 6:
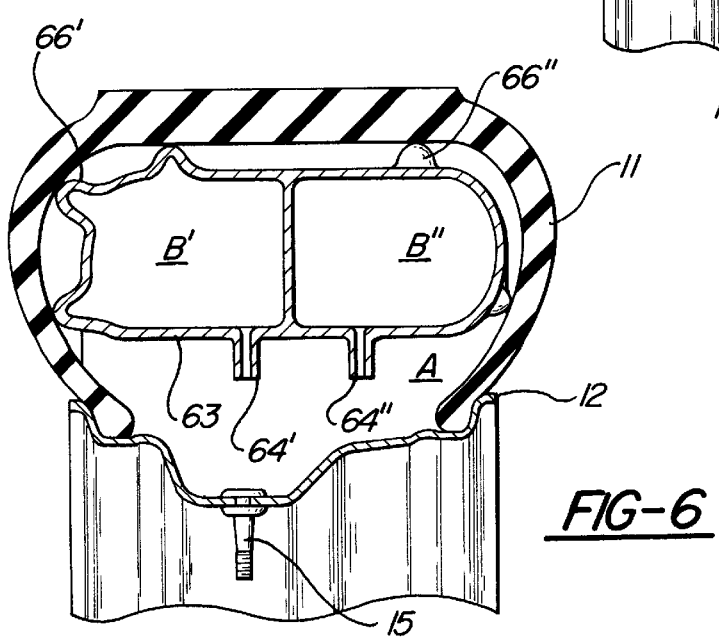
FIG. 6 shows a radial cross section of an embodiment of the proposed wheel in which a detached insert is placed inside the tire.

While partition 13 in FIGS. 1, 3, 4, 5 is an effective means for generating a pressure differential between two volumes (reservoirs) inside the tire which results in generating flow in passageway (capillary/orifice) 14 and ensuing dissipation of vibratory energy (damping), in some applications it might be difficult to create and maintain a leak-proof attachment of partition 13 to tire 11 and/or to wheel rim 12. FIG. 6 depicts another embodiment of the invention in which the damping chamber B is the volume inside an annular self-contained insert 63, possibly but not necessarily of a toroidal shape. The insert 63 may be made foldable (e.g., by fabricating it from an elastomeric material) in order to facilitate its insertion inside the tire.

If a finer tuning is required, internal volume of insert 63 can be partitioned into two or more chambers (B' and B'" in FIG. 6), each one connected with the tire cavity by its own passageway, e.g., capillary 64', 64'" for the chambers B', B', respectively.

While a tight fitting of insert 63 inside the tire is not always possible or desirable, it is important to prevent excessive mobility of insert 63 within the tire cavity. It can be achieved by a proper dimensioning of insert 63 or, as shown in FIG. 6, by protrusions 66 which may be designed on the outside of insert 63. Protrusions 66 may be molded integrally with insert 63 as illustrated by 66' or attached to it by any known means, e.g. by bonding, as illustrated by 66''''.

Since tuning of the proposed pneumatic wheel is determined to a large extent by magnitude of flow, resistance through passageway 14, e.g. as documented in the above referenced article, it is desirable in many applications to keep the resistance (and the tuning) constant regardless of amplitude of vibratory exertion on the tire. Such an effect can be achieved if the flow inside passageway 14 is laminar. At high vibratory amplitudes the pressure differential between the tire cavity A and the damping chamber B is increasing, the flow intensity is also increasing, and the flow may become turbulent. This would cause nonlinearity of the flow as a function of the pressure differential. It is known from Hydrodynamics that laminarity of the flow is sustained when its Reynolds' number (e) does not exceed about Re=2,500. For passageways having round cross sections, $$Re = vd/v,$$

where v is velocity of air flow, d is internal diameter of the passageway, and v is kinematic viscosity of gas. Such correlations can be found for other cross sectional shapes, e.g., rectangular. The Reynolds' number for a given flow can be reduced by using several smaller passageways with smaller cross sectional areas instead of one with a large cross sectional area.

Figure 7:
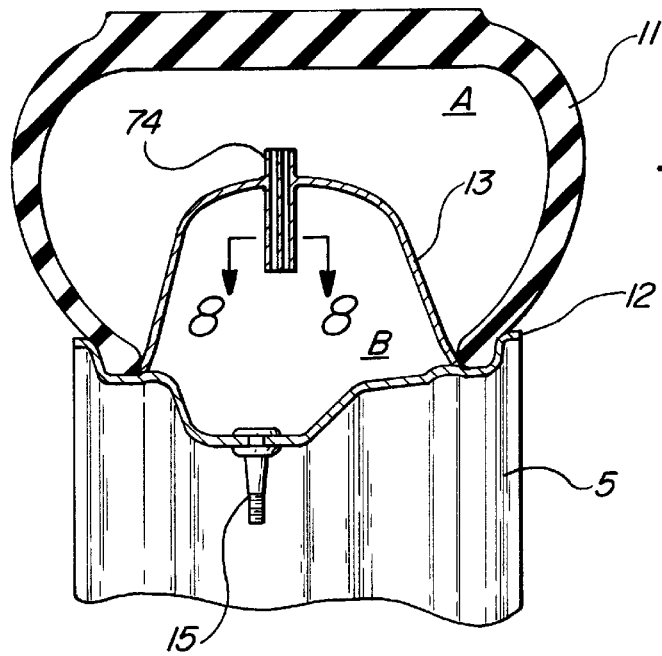
FIG. 7 shows an embodiment of the proposed wheel in which the passageway between the effective tire cavity and the damping chamber is comprised of several capillaries.
Figure 8:
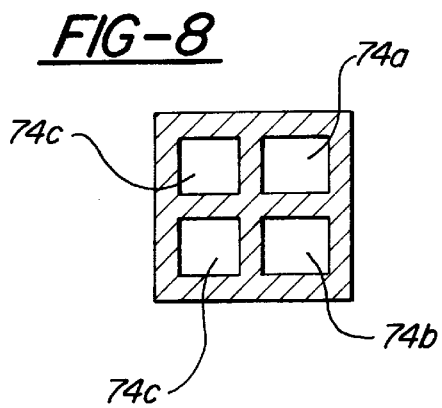
FIG. 8 shows cross section by D—D of the passageway between the effective fire cavity and the damping chamber as shown in FIG. 7.

The passageway (capillary 74) in FIGS. 7 and 8 has it into more than one divided into more than one parallel passages 74a, b, c, d thus increasing the maybe magnitude of the pressure differential between the tire cavity A and the damping chamber B at which the flow still stays laminar, and thus improving linearity of the system. If an orifice is used as a flow passageway between the tire cavity A and the damping chamber B, making the orifice composed from several small orifices would have a similar effect. In some cases, it might be beneficial to use several separate capillaries instead of one capillary subdivided into several parallel capillaries as in FIGS. 7 and 8.

Figure 9:
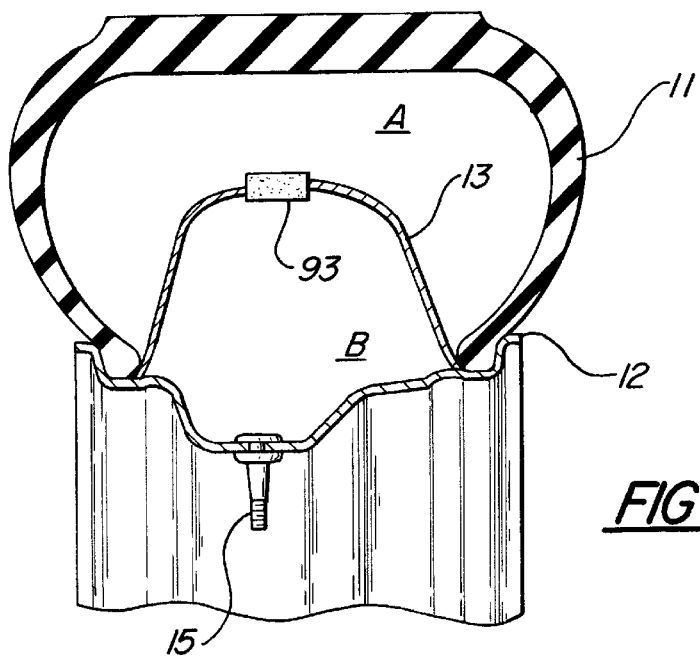
FIG. 9 shows another embodiment of the proposed wheel in which the restricted flow between the effective tire cavity and the damping chamber is provided by a porous insert.

FIG. 9 shows another embodiment of the invention in which at least a part 93 of the partition 13 is made of an open-pore porous material whose surface area and pore sizes are selected to provide the specified flow resistance between the tire cavity A and the damping chamber B. Such system eliminates the need for the orifice/capillary while providing the desired laminary flow. It might be beneficial in some cases to make the whole partition/insert of the porous material.

The invention has been described in what is presently considered to be the most practical and preferred embodiments. The invention is not limited to the disclosed embodiments. Instead, the invention covers the various modifications and equivalent arrangements included within the spirit and scope of the appended claims.

I claim:

1. In an inflated fluid-filled tire adapted to be supported on a vehicle wheel, of the type having a fluid-filled cavity connected with a separate fluid-filled chamber via energy-dissipating passageway, the improvement comprising:
said fluid-filled damping chamber being disposed inside said fluid-filled tire cavity; and
at least one energy-dissipating unrestricted elongated flow passageway connecting said fluid-filled tire cavity with said fluid-filled damping chamber.

2. The tire of claim 1 wherein said fluid-filled tire cavity contains a solid partition separating said fluid-filled reservoirs.

3. The tire of claim 1 wherein said fluid-filled tire cavity contains a collapsible partition separating said fluid-filled reservoirs.

4. The tire of claim 1 wherein said fluid-filled chamber is a separate hollow annular structure inserted into said fluid-filled cavity.

5. The tire of claim 1 wherein said flow passageway is composed of at least one capillary having the Reynolds' number of the flow between said tire cavity and said at least one damping chamber at or below about 2,500.

6. The tire of claim 1 wherein air is used as said fluid.

7. The tire of claims 1 or 4 wherein said hollow annular structure has at least one internal partition separating internal volume of said hollow annular structure into at least two independent damping chambers each connected with said tire cavity by flow-restricting energy-dissipating passageways.

8. The tire of claims 1 or 4 wherein said hollow annular structure is foldable when in the non-inflated condition in order to facilitate its insertion into said fluid-filled tire cavity.

9. The tire of claims 1 or 4 wherein said hollow annular structure inserted into said fluid-filled tire cavity has its external surface shaped to at least partially conform with internal surface of said fluid-filled cavity in order to restrict mobility of said hollow annular structure in relation to said fluid-filled tire cavity.

10. The tire of claims 1 or 6 wherein the external surface of said hollow annular structure has protrusions contacting the internal surface of said fluid-filled tire cavity in order to restrict mobility of said hollow annular structure in relation to said fluid-filled tire cavity.

11. In an inflated fluid tire on the vehicle wheel with fluid-filled cavity of said tire connected with a separate fluid damping chamber via energy-dissipating passageway, the improvement comprising:
at least one fluid-filled damping chamber constructed inside said fluid-filled tire cavity thus partitioning said fluid-filled tire cavity into at least two fluid-filled reservoirs; and
at least a part of the wall of said fluid-filled damping chamber separating it from said fluid-filled tire cavity made of a porous material providing calibrated restricted fluid flow between said fluid-filled tire cavity and said fluid-filled damping chamber.

12. In an inflated fluid tire on the vehicle wheel with fluid-filled cavity of said tire connected with a separate fluid chamber via energy-dissipating passageway, the improvement comprising:
at least one fluid-filled damping chamber constructed inside said fluid-filled tire cavity thus partitioning said fluid-filled cavity into at least two fluid-filled reservoirs;
at least one fluid-filled vessel supported on the wheel;
said at least one fluid-filled damping chamber inside said fluid-filled tire cavity and said at least one fluid-filled vessel supported on the wheel connected by fluid flow passages having low flow resistance; and
at least one energy-dissipating unrestricted elongated passageway connecting said fluid-filled tire cavity with said at least one fluid-filled damping chamber.

13. The tire of claim 12 wherein said fluid-filled vessel is elastically expandable so that its volume is increasing with increasing fluid pressure.

* * * * *